Patented Feb. 19, 1946

2,395,347

UNITED STATES PATENT OFFICE 2,395,347

SULPHUR-CONTAINING ESTERS OF HYDROLYZED ETHYLENE-VINYL ORGANIC ESTER INTERPOLYMERS

William H. Sharkey, Wilmington, Del., assignor to E. I. du Pont de Nemours & Company, Wilmington, Del., a corporation of Delaware No Drawing. Application July 10, 1942,
Serial No. 450,405

17 Claims. (Cl. 260—79)

This invention relates to new compositions of matter, and more particularly to sulphates and sulphonates of hydrolyzed interpolymers of ethylene and a vinyl organic ester and to methods for preparing these sulphates and sulphonates.

Methods have recently been developed by which ethylene may be readily polymerized with a vinyl organic ester, e. g. vinyl acetate, to form interpolymers which in turn are easily and economically hydrolyzed to form polymeric alcohols which differ from polyvinyl alcohol in important respects, particularly in being water-insoluble. In many applications, notably in the preparation of fibers and pellicles, this property of water-insolubility is an important factor which serves to render the polymeric alcohols derived by the hydrolysis of interpolymers of ethylene and vinyl organic esters more desirable than the commercially available polyvinyl alcohol. However, for certain applications, for example, as detergents, textile sizes, adhesives, frothing agents and pigment dispersants, the water-insolubility of the hydrolyzed ethylene-vinyl organic ester interpolymers is an obvious disadvantage. For certain other applications, for example, the preparation of films and coatings, it is desirable to retain the water-insolubility of the hydrolyzed interpolymers but to improve their solubility in organic solvents such as acetone, dioxane, and benzene.

An object of this invention, therefore, is to prepare valuable derivatives of hydrolyzed interpolymers of ethylene with a vinyl organic ester. A further object is to improve the solubility characteristics of the hydrolyzed interpolymers. Another object is to convert the water-insoluble hydrolyzed interpolymers of ethylene with vinyl acetate to water-soluble derivatives having excellent surface active properties. The above and other objects will more clearly appear hereinafter.

These objects are accomplished by this invention which comprises converting hydrolyzed interpolymers of ethylene and a vinyl organic ester to sulphur-containing esters by esterification with a sulphur acid halide of the class consisting of the acid halides of sulphuric and sulphonic acids. By this reaction hydroxyl groups in the hydrolyzed interpolymer are converted into groups of formula

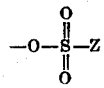

in which Z is a member of the class consisting of the hydroxyl radical and a monovalent hydrocarbon radical.

The expression "vinyl organic ester" as used herein refers to a vinyl ester of an organic acid. The preferred ethylene-vinyl organic ester interpolymers for use in this invention are the ethylene-vinyl acetate interpolymers which are conveniently prepared as follows: A pressure vessel is charged with vinyl acetate, water, an emulsifying agent, a buffer and a catalyst, e. g. an organic peroxide. This mixture is blanketed with nitrogen, evacuated to exclude atmospheric oxygen, then ethylene gas is admitted until the desired pressure is obtained. The pressure vessel is heated to 60°–75° C. and agitated for from 5 to 14 hours. The interpolymer is separated from the reaction mixture by coagulation and volatile impurities are removed by steam distillation. The interpolymer is then washed and dried on a rubber mill. Interpolymers so formed are smoothly and completely hydrolyzed to the corresponding polymeric alcohols in methanol, ethanol, methanol-toluene, or ethanol-toluene solution using a 10% excess of potassium hydroxide or sodium hydroxide in ethanol as the hydrolyzing agent and an operating temperature close to the boiling point of the solvent. The hydrolysis of ethylene-vinyl acetate interpolymers is more completely described in U. S. application Serial No. 446,114, filed June 6, 1942.

A preferred method of converting the hydrolyzed interpolymer of ethylene with a vinyl organic ester into a sulphate consists in treating a chilled dioxane suspension of the hydrolyzed interpolymer with chlorosulphonic acid. The reaction is carried out in a system which is protected from moisture of the atmosphere and in which vigorous agitation is obtained. The reactor is cooled to 10° C. and excess chlorosulphonic acid is added slowly with good agitation. The hydrolyzed interpolymer slowly dissolves during the initial phase of sulphation, after which the temperature is allowed to rise to 20° C. and the stirring is continued for two or more hours. The reaction mixture is poured into excess cold dilute sodium hydroxide solution. This solution is dialyzed through a suitable membrane to remove excess alkali and other inorganic compounds but retains the polymeric sulphate. A solid sulphate in the form of its sodium salt is obtained by evaporation of the dialyzed solution to dryness.

In another suitable method, pyridine is used as the reaction medium. In this method excess chlorosulphonic acid is added slowly to pyridine in a system that is protected from atmospheric moisture and that is cooled externally. An exothermic reaction takes place during this operation. The hydrolyzed interpolymer is then suspended in this mixture and the mixture is heated to 50°–70° C. using vigorous stirring for from 1 to 3 hours. The sulphated interpolymer is isolated by neutralization of the reaction mixture with cold dilute sodium hydroxide solution followed by dialysis and evaporation to dryness of the portion of the product which did not pass through the dialysis membrane.

In both of the above methods it is preferable to isolate the sulphate as a salt since evaporation of an acidic solution by application of heat frequently causes the formation of undesirable, colored and insoluble products. Dialysis is preferably carried out before evaporation of the aqueous solution as otherwise hydrolysis to the insoluble polyalcohol may take place. The evaporation may be carried out under reduced pressure or at atmospheric conditions. If water is removed by distillation under reduced pressure, care must be taken to prevent foaming, as foaming carries the product over with the water that is being removed.

The reactions by which the sulphates of this invention are obtained are illustrated by the following equations:

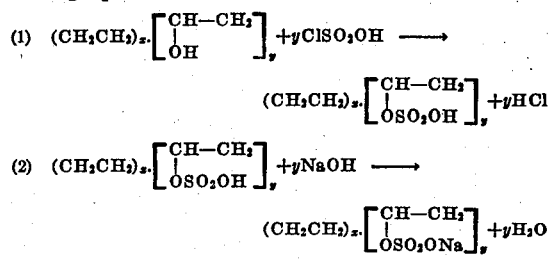

In these equations $x$ and $y$ are integers whose size depends upon the molecular weight of the hydrolyzed interpolymer, i. e. upon the degree of polymerization, and the relative amounts of ethylene and vinyl organic ester (hydrolyzed) present. In practice some of the hydroxyl groups in the hydrolyzed interpolymer generally remain unchanged so that the sulphate will contain some OH groups as well as $OSO_2OH$ groups attached to the carbon atoms in the polymeric chain.

A convenient method for converting the hydrolyzed interpolymer of ethylene with a vinyl organic ester into a sulphonate consists in the addition of a molar excess of a sulphonyl chloride to a well agitated suspension of the hydrolyzed interpolymer in pyridine that has been precooled to 10° C. Agitation is continued for 16 to 20 hours and the temperature is allowed to rise to 25° C. Polymers in which the molar ratio of ethylene to vinyl acetate is about 1/1 or higher dissolve in the reaction mixture while those in which this ratio is 1/3 or lower remain as a flocculent precipitate. The reaction mixture is poured with agitation into hydrochloric acid in cracked ice. The polysulphonate separates and is washed well with dilute hydrochloric acid to remove excess pyridine and then with water. It is dried in air.

The preparation of the polysulphonate is illustrated by the following equation:

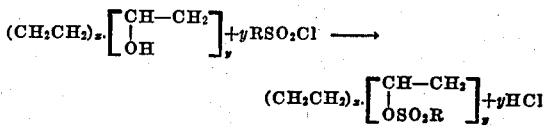

where R is any monovalent hydrocarbon radical, such as butyl, cyclohexyl or tolyl, and $x$ and $y$ are integers.

The following examples further illustrate the invention. Proportions are given in parts by weight unless otherwise specified.

*Example I*

Five parts of the interpolymer obtained by hydrolyzing an ethylene-vinyl acetate interpolymer containing 1.7 mols of ethylene per mol of vinyl acetate, and 200 parts of dioxane are placed in a reactor. The mixture is cooled to 13° C. Thirty-five parts of chlorosulphonic acid are added slowly with vigorous agitation. The interpolymer slowly dissolves. Stirring is continued for one hour. The contents of the reactor are poured into excess cold dilute sodium hydroxide solution and this solution is dialyzed for two days in a container fabricated from cellulose film which serves as the dialysis membrane. After this treatment the solution is neutral to litmus and gives no precipitate with barium chloride. Evaporation of the dialyzed solution yields 3.5 parts of the sodium salt of the sulphate of the hydrolyzed interpolymer. Analysis shows that the product is 30% sulphated, i. e. 30% of the original hydroxyl groups in the interpolymer have been sulphated The sodium salt decomposes at 165° C. and is soluble in water but insoluble in common organic solvents. Aqueous solutions of the salt may be cast into flexible films which adhere tenaciously to glass.

*Example II*

Ninety-eight parts of pyridine are placed in a reactor and cooled to 10° C. To this is added slowly with good agitation 21 parts of chlorosulphonic acid. An exothermic reaction takes place that soon subsides. Three parts of the hydrolyzed ethylene-vinyl acetate interpolymer described in Example I is suspended in this mixture and the mixture is heated to 50°–70° C. Heating is continued for one hour using vigorous agitation, during which time the interpolymer slowly dissolves. The reaction mixture is allowed to cool to room temperature and is then poured into excess cold dilute sodium hydroxide solution. The resulting alkaline solution is dialyzed in a container fabricated from cellulose film for two days. Evaporation of the dialyzed solution to dryness gives 3.5 parts of the sodium salt of the sulphated hydrolyzed ethylene-vinyl acetate interpolymer (78% sulphation). The sodium salt of the sulphated interpolymer decomposes at 165°–170° C. and is soluble in water but insoluble in common organic solvents. Films useful as adhesives can be cast from water solutions of the sodium salt. Such films have tensile strengths in the neighborhood of 1400 lbs./sq. in. and can be elongated 100% before breaking.

*Example III*

This example illustrates the sulphation of the interpolymer obtained by hydrolyzing ethylene-vinyl acetate interpolymer containing 10.7 mols of ethylene per mol of vinyl acetate.

In a reactor having three openings is placed 100 parts of the above hydrolyzed interpolymer and 1000 parts of dioxane. To the openings are connected a stirrer, separatory funnel, and reflux condenser. The reactor is cooled to 10° C. and then 68 parts of chlorosulphonic acid dissolved in 100 parts of dioxane is added slowly with good agitation. Agitation is continued for 3 days at room temperature and 68 parts of chlorosulphonic acid is added each day. However, the interpolymer does not dissolve. Isolation is carried out by neutralization with cold, dilute sodium hydroxide solution followed by dialysis to remove water-soluble impurities. During these operations the sulphate is present in a suspension as a water-insoluble salt. The insoluble salt is separated on a filter and dried. The yield is 92.6 parts of the insoluble sodium salt of the sulphate of the hydrolyzed ethylene-vinyl acetate interpolymer (55% sulphation).

*Example IV*

This example illustrates the preparation of a sulphate (sodium salt) of an interpolymer obtained by hydrolyzing an ethylene-vinyl acetate interpolymer containing 3.74 mols of ethylene per mol of vinyl acetate.

In a reactor having three openings is introduced 100 parts of the above hydrolyzed ethylene-vinyl acetate interpolymer and 2000 parts of dioxane. The openings of the reactor are fitted with a separatory funnel, agitator, and reflux condenser. The reactor is cooled to 10° C. and 132 parts of chlorosulphonic acid is added slowly with good agitation. The temperature is allowed to rise to 20° C. and agitation is continued for 16 hours. Neutralization is effected by pouring the reaction mixture into a mixture of 100 parts of sodium hydroxide and 1500 parts of cracked ice. Dialysis through a container fabricated out of cellulose film removes inorganic materials and dioxane. On evaporation of the remainder to dryness, 138 parts of the sodium salt of the sulphated hydrolyzed ethylene-vinyl acetate interpolymer (90% sulphation) is obtained as a residue. This sulphated hydrolyzed interpolymer is insoluble in the common organic solvents but is water-soluble and can be cast into films from aqueous solution. Aqueous solutions foam when shaken, wet sulphur, improve the stability of a water-benzene emulsion, and have a cleansing action when used in laundering.

*Example V*

This example illustrates the preparation of a p-toluenesulphonate of hydrolyzed ethylene-vinyl acetate interpolymer and the use of this compound to alkylate aniline.

Into a reactor is introduced 20 parts of completely hydrolyzed ethylene-vinyl acetate interpolymer containing 1 mol of ethylene per 1.17 mols of vinyl acetate (softening point 150°–155° C.), and 196 parts of pyridine. The reactor is cooled to 0° C. and 54 parts of p-toluenesulphonyl chloride are added. This is kept at 0° C. during which time the polymer dissolves and the solution assumes a reddish-brown color. It is then allowed to stand 15 hours at room temperature and, finally, is agitated vigorously for 3.5 hours at 10° C. The viscous reaction mixture is poured into cracked ice mixed with 295 parts of concentrated hydrochloric acid. A waxy precipitate forms which is then washed well with water and dried. The yield is 43 parts of the p-toluenesulphonate of the hydrolyzed ethylene-vinyl acetate interpolymer softening at 92–94° C. Analysis shows that the product is 63% sulphated, i. e. 63% of the hydroxyl groups in the hydrolyzed interpolymer have been converted to p-toluenesulphonate groups.

Ten parts of the above p-toluenesulphonate of the hydrolyzed ethylene-vinyl acetate interpolymer and 178.2 parts of aniline are heated to the boiling temperature for a period of 16 hours. During the first half hour of heating the polymer dissolves and the solution assumes a reddish-brown color. At the end of the heating period, 0.3 part of sodium hydroxide dissolved in water is added and the reaction mixture is steam distilled to remove excess aniline. During this operation the polymer separates. The water present is poured off and the polymer remaining is washed with water to remove the sodium hydroxide. This residue amounts to 9.7 parts of a polymer containing 5.41% nitrogen. In the polymer, as shown by calculations based on nitrogen analysis, 37% of the hydroxyl groups remain unchanged, 49% have been converted to N-phenylamino groups, and 14% have been converted to p-toluenesulphonate groups. This polymer forms salts with acids and can be used as an agent to remove anions in water purification.

*Example VI*

A mixture of 10 parts of hydrolyzed ethylene-vinyl acetate interpolymer containing 1.3 mols of ethylene per mol of vinyl acetate, and 247.5 parts of pyridine are cooled to 10° C. in a reaction vessel protected from ingress of moisture. To this mixture is added 20 parts of butanesulphonyl chloride dropwise with agitation. During this addition the temperature of the reaction mixture is kept at 10°–15° C. Agitation is continued for 20 hours and the temperature is allowed to rise to 25° C. during which time the polymer slowly dissolves. The resulting solution is poured into a mixture of 381 parts of concentrated hydrochloric acid and 500 parts of cracked ice. A polymer separates that is washed well with dilute hydrochloric acid, then with water, and is then dried to yield 10 parts of the butanesulphonate of the hydrolyzed ethylene-vinyl acetate interpolymer. Analysis shows that 33% of the hydroxyl groups of the hydrolyzed interpolymer have been converted to butanesulphonate groups. This polysulphonate can be cast from dioxane solution into a film that softens near 50° C. and has a cold crack temperature of −15° C.

*Example VII*

Five parts of hydrolyzed ethylene-vinyl acetate interpolymer containing 1 mol of ethylene per 3.1 mols of vinyl acetate, and 247.5 parts of pyridine are placed in a reactor fitted with an agitator, a reflux condenser and a device for adding liquids dropwise. The reactor is cooled to 10° C. and 29 parts of butanesulphonyl chloride are added dropwise with stirring. The reaction solution is allowed to warm to 25° C. and stirring is continued for 24 hours. The reaction mixture is then poured into 381 parts of concentrated hydrochloric acid and 500 parts of cracked ice. A flocculent precipitate (9.1 parts) of the butanesulphonate of the hydrolyzed ethylene-vinyl acetate interpolymer separates, and is washed well with water and dried. Analysis shows a conversion of 9% of the hydroxyl groups in the original interpolymer to butanesulphonate groups.

A film softening at 135°–140° C., having a cold crack temperature of 10° C. and a tensile strength of 3006 lbs./sq. in. at 108% elongation, is formed from the above polybutanesulphonate by casting its aqueous-alcohol solution onto a glass plate, allowing the solvent to evaporate, and subsequently stripping the dried film from the plate.

It is to be understood, of course, that the above examples are merely for purposes of illustration and that the invention is not limited to the exact reagents, conditions and procedures therein described but is susceptible rather to wide modification and the substitution of a broad range of equivalents. Thus, in addition to sulphates and sulphonates of hydrolyzed interpolymer of ethylene and vinyl acetate, which are the preferred products, sulphates and sulphonates of hydrolyzed interpolymers of ethylene with other vinyl organic esters, such as vinyl propionate, vinyl isobutyrate, vinyl pimelate, vinyl 2-ethyl hexanoate, and vinyl benzoate, can be prepared in the same fashion. The hydrolyzed interpolymers used need not be completely hydrolyzed.

The methods for the preparation of the sulphates and sulphonates are very similar. Owing to the fact that the solubility characteristics of the two esters differ, the sulphates being water-soluble and the sulphonates water-insoluble, the methods of separating and purifying the products differ. This is illustrated by the foregoing examples.

Although the foregoing examples illustrate the use of the acid chloride of sulphuric and sulphonic acids, other acid halides of these acids, for example, fluorosulphonic acid, p-toluenesulphonyl bromide and p-toluenesulphonyl iodide, can also be used as the esterifying agent.

Hydrolysis products of interpolymers containing a very high mol ratio of ethylene to the vinyl ester, interpolymers in which this ratio is very low, and interpolymers of intermediate compositions can all be esterified with acid halides of sulphuric and sulphonic acids by methods given herein. However, it will be recognized that the properties of the products will vary with the composition of the interpolymer and that certain compositions will be preferred over others depending upon the use to which they are to be put. Thus, an important factor in determining the utility of the sulphates for a given purpose is their solubility in water. The degree of solubility in water of the sulphates is governed by the proportion of hydroxyl groups in the original hydrolyzed interpolymer and also by the proportion of these that are converted to sulphate groups. The properties of the sulphates can be adjusted in the following ways: (1) complete sulphation of a completely hydrolyzed interpolymer containing a large or small proportion of vinyl ester in relation to ethylene, (2) complete sulphation of a partially hydrolyzed interpolymer consisting of a large or small proportion of vinyl ester, and (3) partial sulphation of a polyalcohol derived by completely or incompletely hydrolyzing an interpolymer containing a large or small proportion of vinyl ester.

Sulphates of the hydrolyzed interpolymers in which the mol ratio of ethylene to vinyl ester in the unhydrolyzed interpolymer is in the vicinity of 8/1 or greater are insoluble in water and are, therefore, unsuitable for many applications. As the mol ratio of ethylene to vinyl ester in the hydrolyzed interpolymer decreases, the sulphate becomes more soluble. The preferred sulphates for most purposes are those obtained from hydrolyzed ethylene-vinyl ester interpolymers in which the mol ratio of ethylene to vinyl ester lies between 8/1 and 1/8. Sulphates of hydrolyzed interpolymers in this range have optimum water solubility for many applications. For certain uses, for instance, in applications such as for textile sizes, it is desirable to have a soluble sulphate that forms viscous solutions. Adjustment in viscosity of the solution can be made by varying the ratio of interpolymer components; e. g., the viscosity of a 20% solution decreases as the mol ratio of ethylene to vinyl acetate in the unhydrolyzed interpolymer decreases.

Another method of adjusting water solubility is to limit the degree of sulphation. In short, water solubility is dependent upon the ratio of sulphate groups to carbon atoms and this ratio can be controlled by the methods herein disclosed. For example, the sodium salt of a completely sulphated hydrolyzed 1/1 ethylene-vinyl acetate interpolymer, that is, a product having one sulphate group for each four carbon atoms, is water-soluble; whereas the same hydrolyzed interpolymer, sulphated to the extent of one sulphate group per 20 to 30 carbon atoms is essentially insoluble. The preferred range for the degree of sulphation lies between 30% and 100% of the hydroxyl groups converted to sulphate groups.

Although the sodium salt of the sulphates of these hydrolyzed interpolymers has been described in the examples, the acid sulphates and also salts such as of potassium, barium and calcium can be prepared similarly. Other metallic salts, ammonium salts, salts with amines, and complexes with amino acids are illustrative of other modifications of this class of compounds.

The sulphated products of this invention are preferably prepared by the interaction of the polyalcohol with chlorosulphonic acid in a medium that acts as a hydrohalide acceptor. Such media include dioxane, pyridine, dimethyl aniline, or a two phase system such as calcium oxide suspended in an ether. The reaction is carried out using good agitation at temperatures varying from 10° C. to 70° C., and preferably in the lower part of this range since high temperatures may cause some discoloration. Before isolation, the product is neutralized in a cold alkaline solution which may consist of alkali or alkaline earth metal hydroxides or carbonates or amine solutions. Water-soluble impurities such as excess alkali, inorganic sulphates, and the solvent, if the latter is water-soluble, are removed by dialysis through a suitable membrane, e. g. parchment paper, cellulose film, collodion, etc., and the sulphated interpolymer is obtained by evaporation of the dialyzed solution. Dialysis must be carried out before evaporation since heating an alkaline solution of the polysulphate results in hydrolysis to the insoluble interpolymer. It is preferable to isolate the sulphate as a salt, although a solution of the free acid can be obtained by dialysis prior to neutralization through an acid resistant membrane.

The sulphonates of the hydrolyzed interpolymers, as in the case of the sulphates, are preferably prepared in the presence of a substance, like pyridine or dimethyl aniline, which acts as a hydrohalide acceptor. An excess of the sulphonyl halide is employed unless a low substituted product is desired. The reaction takes place at ordinary temperatures or even below so that it is unnecessary to apply heat.

The polymeric sulphonates, unless the number of sulphonate groups is relatively low, are water-insoluble. Unlike the original hydrolyzed interpolymer they are soluble in acetone, dioxane, and benzene. Films of the sulphonates are more pliable than those of the hydrolyzed interpolymer from which they are prepared but have a lower softening point. The softening point increases with a decrease in the ratio of ethylene to vinyl ester in the original interpolymer. The preferred sulphonates for use in making films are derived from hydrolyzed ethylene-vinyl ester interpolymers in which the ratio of ethylene to vinyl ester is between about 1/1 and about 1/8.

The reaction by which the sulphates and sulphonates are prepared can be carried out in any type of reaction chamber which is resistant to the reagents used. It is important, however, that adequate temperature control be provided and that agitation be maintained in order to insure good contact between the hydrolyzed interpolymer and the esterifying agent.

The sulphates of hydrolyzed interpolymers of vinyl organic esters with ethylene, preferably in the form of salts, comprise a class of polymeric materials unique in the facility with which their water solubility can be adjusted. The products consist essentially of polymeric paraffin hydrocarbon chains having attached thereto $$-OSO_2OM$$

groups (wherein M is hydrogen or an alkali metal) which solubilize the polymer. These products differ from polyvinyl alcohol sulphates in that they contain a greater number of methylene groups per $-OSO_2OM$ groups. This leads to improved properties for certain uses, particularly for use as detergents.

Aqueous solutions of the sulphates of this invention can be employed as detergents, sizes for textile fibers and paper, pigment dispersants, emulsifying agents, and as tanning agents. In film form they may be used as adhesives, for example, in safety-glass interlayers.

The sulphonates of this invention are useful in making films for wrapping purposes and closures for bottles. They can also be spun into fibers or used as coating compositions. Still another use for the sulphonates is as alkylating agents; for example, they can be used to alkylate amines in the formation of substances useful in removing anions in water purification.

I claim:

1. Sulphur-containing esters of hydrolyzed interpolymers of ethylene with a vinyl ester of an organic carboxylic acid, said sulphur-containing esters being of the group consisting of sulphates and sulphonates.

2. Sulphates of hydrolyzed interpolymers of ethylene with a vinyl ester of an organic carboxylic acid.

3. Hydrolyzed interpolymers of ethylene with a vinyl ester of an organic carboxylic acid, said hydrolyzed interpolymer having at least 30% of its hydroxyl groups sulphated.

4. Sulphates of the hydrolyzed interpolymers of ethylene with a vinyl ester of an organic carboxylic acid, the mol ratio of ethylene to vinyl ester in the interpolymer varying from about 8/1 to about 1/8.

5. Sulphates of the hydrolyzed interpolymers of ethylene with a vinyl ester of an organic carboxylic acid, the mol ratio of ethylene to vinyl ester in the interpolymer varying from about 8/1 to about 1/8, said hydrolyzed interpolymer having at least 30% of its hydroxyl groups sulphated.

6. Sulphates of the hydrolyzed interpolymer of ethylene with vinyl acetate.

7. Hydrolyzed interpolymers of ethylene with vinyl acetate, said hydrolyzed interpolymer having at least 30% of its hydroxyl groups sulphated.

8. Sulphates of the hydrolyzed interpolymers of ethylene with vinyl acetate, the mol ratio of ethylene to vinyl acetate in the interpolymer varying from about 8/1 to about 1/8.

9. Sulphates of the hydrolyzed interpolymers of ethylene with vinyl acetate, the mol ratio of ethylene to vinyl acetate in the interpolymer varying from about 8/1 to about 1/8, said hydrolyzed interpolymer having at least 30% of its hydroxyl groups sulphated.

10. Sulphonates of hydrolyzed interpolymers of ethylene with a vinyl ester of an organic carboxylic acid.

11. Sulphonates of hydrolyzed interpolymers of ethylene with a vinyl ester of an organic carboxylic acid, the mol ratio of ethylene to vinyl ester in the interpolymer varying from about 1/1 to about 1/8.

12. Sulphonates of hydrolyzed interpolymers of ethylene with vinyl acetate.

13. A method for preparing sulphur-containing esters of hydrolyzed interpolymers of ethylene with a vinyl ester of an organic carboxylic acid which comprises reacting said hydrolyzed interpolymer with a sulphur acid halide of the class consisting of the acid halides of sulphuric and sulphonic acids.

14. The method of preparing sulphates of the hydrolyzed interpolymers of ethylene with a vinyl ester of an organic carboxylic acid which comprises reacting said hydrolyzed interpolymer with chlorosulphonic acid at temperatures within the range of about 10° C. to about 70° C., and isolating the polymeric sulphate formed.

15. The method of preparing sulphates of the hydrolyzed interpolymers of ethylene with a vinyl ester of an organic carboxylic acid which comprises reacting said hydrolyzed interpolymer in a suspension of dioxane with chlorosulphonic acid and at a temperature within the range of about 10° C. to about 70° C., and isolating the polymeric sulphate formed.

16. The method of preparing sulphonates of the hydrolyzed interpolymers of ethylene with a vinyl ester of an organic carboxylic acid which comprises reacting said hydrolyzed interpolymer with a sulphonyl chloride and isolating the polymeric sulphonate formed.

17. The method of preparing sulphates of the hydrolyzed interpolymers of ethylene with a vinyl ester of an organic carboxylic acid which comprises reacting said hydrolyzed interpolymer in a suspension of pyridine with chlorosulphonic acid and at a temperature within the range of about 10° C. to about 70° C., and isolating the polymeric sulphate formed.

WILLIAM H. SHARKEY.